(12) United States Patent
Kojima

(10) Patent No.: US 6,431,528 B1
(45) Date of Patent: Aug. 13, 2002

(54) APPARATUS FOR REMOVING IMPURITIES IN LIQUID

(76) Inventor: Hisao Kojima, 3-53-21, Shioiri-cho, Tsurumi-ku, Yokohama-shi, Kanagawa-ken (JP)

(*) Notice: Subject to any disclaimer, the term of this patent is extended or adjusted under 35 U.S.C. 154(b) by 0 days.

(21) Appl. No.: 09/680,269

(22) Filed: Oct. 6, 2000

(30) Foreign Application Priority Data

Oct. 7, 1999 (JP) .......................................... 11-287101

(51) Int. Cl.$^7$ ................................................ B01F 3/04
(52) U.S. Cl. ..................... 261/79.2; 261/113; 96/296; 96/326; 366/339; 366/340
(58) Field of Search .................. 261/79.2, 94, 113; 96/296, 314, 320, 324, 326; 366/338, 339, 340, 341

(56) References Cited

U.S. PATENT DOCUMENTS

| | | | | |
|---|---|---|---|---|
| 2,317,101 A | * | 4/1943 | Lecky | 261/79.2 |
| 2,817,415 A | * | 12/1957 | Sykes | 261/79.2 |
| 3,094,401 A | * | 6/1963 | Lidell | 261/113 |
| 3,286,992 A | * | 11/1966 | Armeniades et al. | 261/79.2 |
| 3,953,002 A | * | 4/1976 | England, Jr. et al. | |
| 4,747,697 A | * | 5/1988 | Kojima | 366/339 |
| 4,878,925 A | * | 11/1989 | Kojima | |
| 5,104,233 A | * | 4/1992 | Kojima | 366/339 |
| 5,215,130 A | * | 6/1993 | Kojima et al. | |
| 5,215,375 A | * | 6/1993 | Ditzler et al. | 366/340 |
| 5,312,185 A | * | 5/1994 | Kojima et al. | |
| 5,605,400 A | * | 2/1997 | Kojima | |
| 5,945,039 A | | 8/1999 | Kojima | |

FOREIGN PATENT DOCUMENTS

| | | | | |
|---|---|---|---|---|
| CA | 1063926 | * | 10/1979 | 261/79.2 |
| DE | 1193477 | * | 5/1965 | 261/79.2 |
| NO | 47009 | * | 10/1929 | 261/79.2 |
| NO | 48856 | * | 1/1931 | 261/79.2 |
| SU | 603411 | * | 4/1978 | 261/79.2 |

OTHER PUBLICATIONS

Metcalf & Eddy, "Removal of Nitrogen by Physical and Chemical Processes", Air Stripping of Ammonia, Wastewater Engineering, Third Edition, 1991, pp. 735–739.

George Tchobanoglous, "Physical and Chemical Processes for Nitrogen Removal–Theory and Application", pp. 110–135.

* cited by examiner

Primary Examiner—C. Scott Bushey
(74) Attorney, Agent, or Firm—Oblon, Spivak, McClelland, Maier & Neustadt, P.C.

(57) ABSTRACT

Static mixers are arranged so that its longitudinal direction is substantially vertical. A liquid supply mechanism supplies the liquid containing impurities from the upper end of the static mixer into the static mixer. A gas supply mechanism supplies gas from the lower end of the static mixer into the static mixer. The static mixer is fabricated so that one or more mixing elements comprising a passage tube through which fluid can pass and one or more spiral blades arranged inside the passage tube are, continuously or through one or more spacers, arranged in the longitudinal direction thereof. The liquid drops down inside the static mixer and the gas rises up inside the static mixer, so that the two are subjected to gas-liquid contact inside the static mixer.

7 Claims, 7 Drawing Sheets

APPARATUS FOR REMOVING IMPURITIES IN LIQUID

BACKGROUND OF THE INVENTION

1. Field of the Invention

The present invention relates to an apparatus for removing impurities in liquid, wherein the impurities, volatile substances or the like in the liquid are subjected to gas-liquid contact with a gas phase so that they are transferred to the gas phase to separate or purify the liquid phase. Specifically, the present invention relates to an apparatus for removing impurities in liquid, which can be used under a compressed, decompressed, heated or cooled condition and is suitable for the following: purification of a liquid phase or recovery of a volatile substance wherein the volatile substance that is a halogenated organic compound such as trichloroethylene, methylene chloride or trihalomethane in the liquid phase is subjected to gas-liquid contact with a gas phase to emit the volatile substance in the liquid phase into the gas phase; purification of a liquid phase wherein a dissolved gas such as $O_2$ or $NH_3$ in the liquid phase is exposed to a gas phase such as $N_2$, air, water vapor, He or Ar; separation or purification wherein an insoluble substance in a liquid phase is distilled out by steam distillation; or hydro-refining wherein sulfur contained in fuel or the like is subjected to gas-liquid contact with hydrogen gas to carry out desulfurization.

2. Description of the Related Art

Hitherto, as an apparatus for removing impurities in liquid, there has been known a plate tower (tray tower) type apparatus having therein porous plates, or a packed tower type apparatus wherein a filling material is regularly or irregularly filled.

However, in the packed tower type apparatus wherein a filling substance is regularly filled, a gas-liquid contact manner as using wet walls is carried out. Thus, used liquid is a little so that the liquid film on the surface of the filling substance becomes thin. Therefore, the efficiency of the gas-liquid contact is superior. However, if the load of the liquid gets large, the liquid film becomes thick so that the efficiency of the gas-liquid contact deteriorates. For this reason, a problem arises that the capacity of the liquid to be treated cannot be made large.

In the tray tower type apparatus, an effective area on the trays becomes small by a downcomer for conducting liquid on the surface of porous plates, so that a dead space is generated. Thus, troubles are caused by stay of liquid or adhesion or growth of solid or solid matters. Therefore, maintenance is necessary. Pressure loss is also large because the effective area on the trays gets less. For this reason, the pressure in the tower becomes high so that the following problems arise: power consumption and steam consumption increase and the yield of products also deteriorates. Furthermore, in order to prevent the generation of flooding, it is necessary that the flow rate of gas in the tower is set up to 1 m/second or less. Thus, the diameter of the tower increases. In order to adjust the flow of the gas and the liquid, a distributor is also necessary inside the tower.

SUMMARY OF THE INVENTION

An object of the present invention is to provide an apparatus for removing impurities in liquid, making it possible to improve its performance by an improvement in the ratio of recovery, save energy and space, make maintenance unnecessary, reduce pressure loss, make running management easy, and make a distributor unnecessary.

The apparatus for removing impurities in liquid according to the present invention comprises a static mixer arranged so that its longitudinal direction is vertical; a liquid supply mechanism supplying the liquid containing impurities from the upper end of the static mixer into the static mixer; and a gas supply mechanism supplying gas from the lower end of the static mixer into the static mixer. The static mixer is fabricated so that one or more mixing elements comprising a passage tube through which fluid can pass and one or more spiral blades arranged inside the passage tube are, continuously or through one or more spacers, arranged in the longitudinal direction thereof and the liquid drops down inside the static mixer and the gas rises up inside the static mixer, so that the two are subjected to gas-liquid contact inside the static mixer.

In the present invention, the liquid drops down inside the static mixer and the gas rises up inside the static mixer, so that the two are subjected to gas-liquid contact inside the static mixer. Thus, the impurities contained in the liquid are subjected to mass transfer to the side of the gas so that the impurities can be separated from the liquid or the liquid can be purified. For this reason, the purified liquid and the gas containing the impurities can be recovered or discharged.

In the present invention, fluid passes through the mixing element(s) wherein the spiral blades or blades are arranged, which is different from the tray tower manner in the prior art. Therefore, pressure loss can be reduced, and costs for motive power and consumption of water vapor can also be reduced. In addition, the liquid drops down and the gas rises up so that the efficiency of the gas-liquid contact increases. Thus, the efficiency for recovering the impurities is improved and the performance of the apparatus can be made high, so that energy can be saved.

The apparatus can be small-sized since pressure loss is low. Since the efficiency of the gas-liquid contact is also high, the impurities can be separated from the liquid or the liquid can be purified even if the ratio between the liquid and the gas is greatly changed. Therefore, maintenance of the apparatus becomes easy. Dead space is substantially lost so that maintenance is not required, since the efficiency of the gas-liquid contact is high.

In the present invention, the blade or blades are preferably arranged to be twisted in the right or left direction, and composed of one or more porous plates.

In this manner, the liquid and the gas can be uniformly dispersed in the whole of the mixing element(s). Therefore, the liquid can be more efficiently brought into contact with the gas in the static mixer. The upward and downward flows inside the passage tube are adjusted by means of the pores of the porous plate(s), so that no distributor becomes necessary. The fluid is uniformly dispersed so that the dead space can be more reduced. The thermal distribution of the fluid can also be made uniform.

The blade or blades are preferably missing in the center of the passage tube.

The flow rate (superficial velocity) of the gas in the static mixer is preferably from 1.0 to 10 m/second.

Since the diameter of the passage tube can be small, the whole of the apparatus can be made smaller.

The percentage of the area of pores in the porous plate or plates is preferably from 5 to 80%. The diameter of the pores in the porous plate or plates is preferably from 5 to 30 mm.

The impurities in the liquid is preferably brought in contact with the gas so that the impurities are gasified or reacted, whereby the impurities are separated from the liquid and discharged together with the gas.

DETAILED DESCRIPTION OF THE PREFERRED EMBODIMENTS

Figure 1:
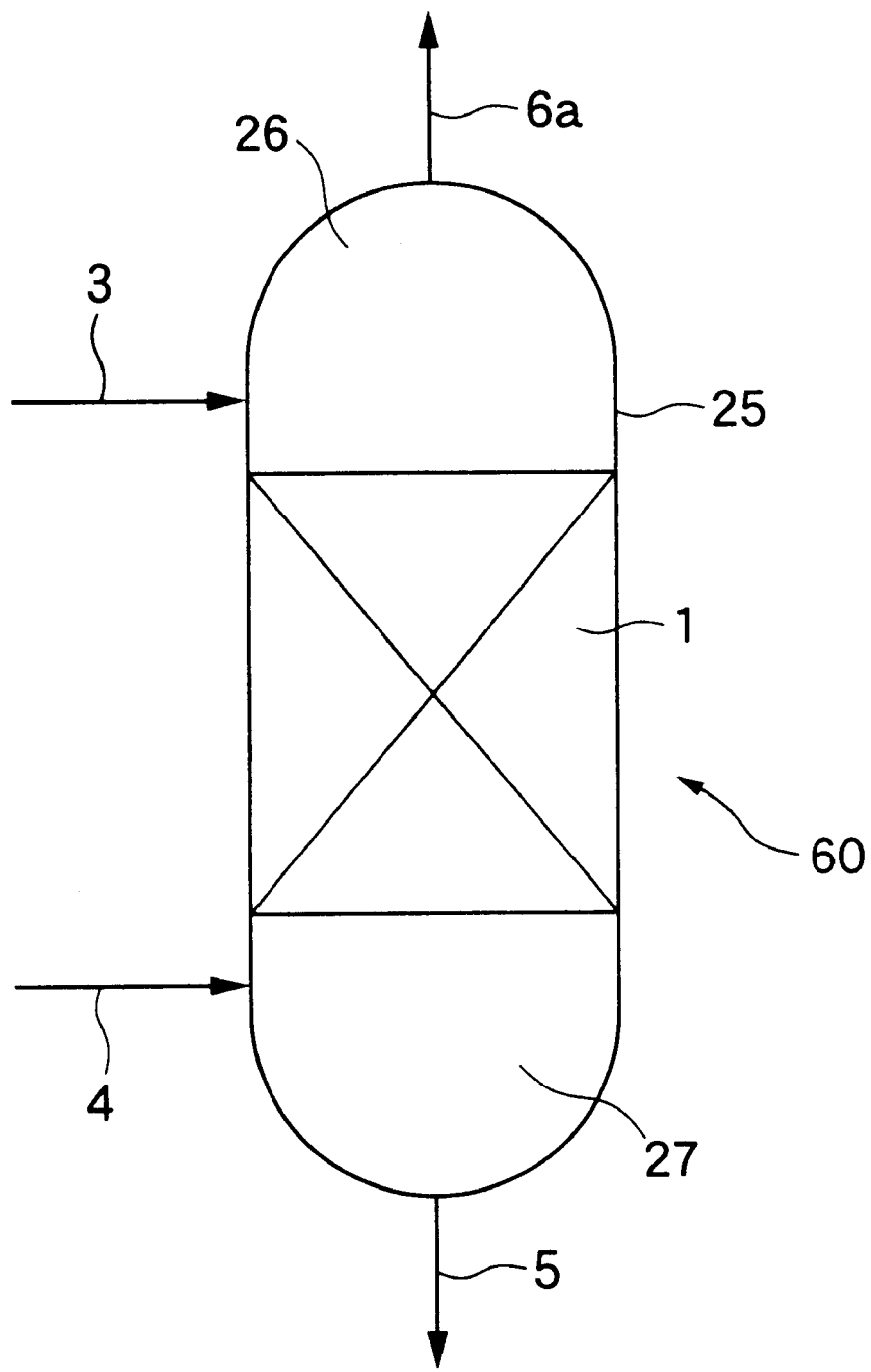
FIG. 1 is a schematic view showing an apparatus for removing impurities in liquid according to a first embodiment of the present invention.

Apparatus for removing impurities in liquid according to embodiments of the present invention will be specifically described hereinafter, referring to the attached drawings. FIG. 1 is a schematic view showing an apparatus for removing impurities according to a first embodiment of the present invention, FIG. 2A is a cross section of a mixing element of a static mixer used in the present embodiment, and FIG. 2B is a perspective view thereof.

Figure 2A:
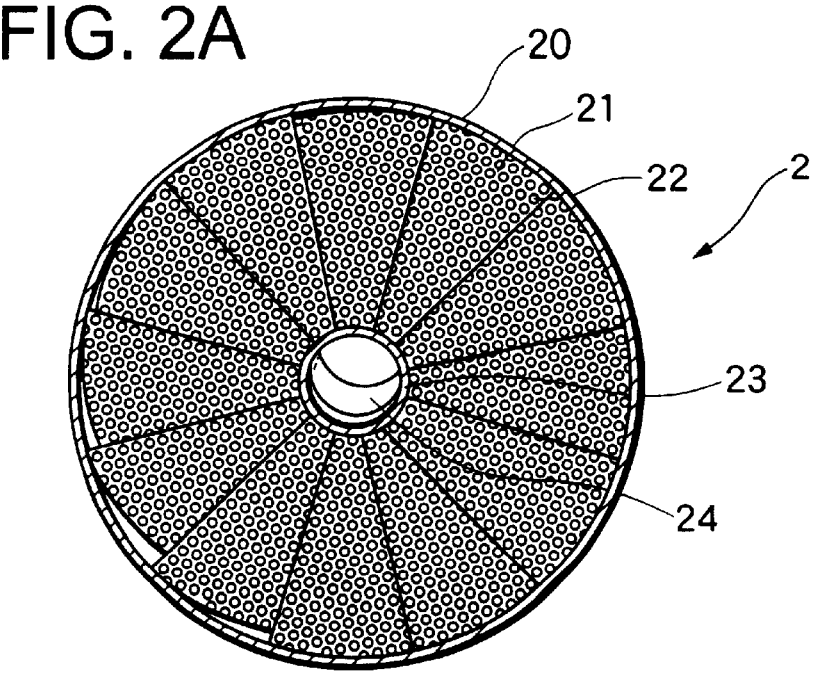
FIG. 2A is a sectional view of a mixing element of a static mixer used in the present embodiment.
Figure 2B:
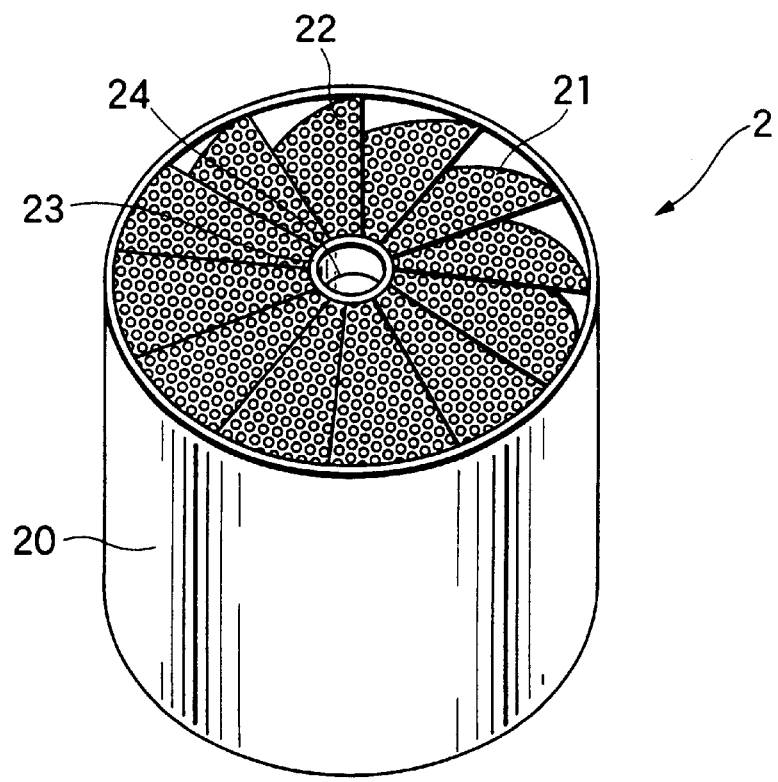
FIG. 2B is a perspective view thereof.

As shown in FIGS. 2A and 2B, the mixing element 2 of the static mixer 1 used in the present embodiment has an external cylinder (passage tube) 20, blades 21 (spiral blades) set up in the external cylinder 20, an internal cylinder 23 intermittently disposed to arrange the blades 21 inside the external cylinder 20. The blades 21 are made of, for example, porous plates. The internal cylinder 23 is set up to improve mechanical strength against twist stress of the blades 21.

That is, the internal cylinder 23 is set up by a length necessary for connecting-portions of the blades 21, and is not set up at the other portions. One end of each of the blades 21 is connected to the outer circumference face of the internal cylinder 23. The blade is twisted in the counterclockwise direction (left side) from the outer circumference face of the internal cylinder 23 to the inner circumference face of the external cylinder 20. The other end thereof is connected to the inner circumference face of the external cylinder 20. Since the internal cylinder 23 has at its center an opening, the blades 21 are not present in the central axis portion of the external cylinder 20. This portion is missing. Thus, the internal cylinder 23 has, at its central axis portion, an opening 24 having no blades, as shown in FIGS. 2A and 2B. Similarly, plural blades 21 that are twisted left are connected to the outer circumference face of the internal cylinder 23, so that a fluid passage is formed. The plural mixing elements 2 are arranged continuously or through spacers in its longitudinal direction, so that the static mixer 1 is fabricated. Spacer (not shown) may be arranged between the mixing elements 2.

During the time when two fluids (liquid and gas) flow in directions counter to each other in the fluid passage in the static mixer 1, a part of the fluids rotates spirally along the blades 21 to become flow circling in the left direction. Another part thereof passes through pores 22 of the blades 21. The remainder part thereof is sheared by the blades 21, joints the fluid that has flown through the pores 22, and is then separated. In this manner, the rotation, passage, shear, joint and separation are repeated so that the two fluids flowing in the directions counter to each other are mixed. The blades 21 are made of porous plates. Therefore, the fluids pass through the pores 22 and the upward and downward flows inside the external cylinder 20 are adjusted. In addition, such flows joint the fluid moving in the form of circling-flow. Thus, the fluids are uniformly dispersed in the whole of the mixing elements 2. For this reason, the efficiency of the gas-liquid contact increases and any dead space is lost so that maintenance and inspection become unnecessary. Any distributor also becomes unnecessary since the fluids are uniformly dispersed in the static mixer 1. The blades 21 in the static mixer 1 in the present invention are not limited to left-twisted blades and may be right-twisted blades.

If the percentage of the area of the pores in the porous plate as the blades 21 is from 5 to 80%, the porous plate can easily be produced so that production-costs can be reduced. Moreover, mechanical strength of the blades and the efficiency of the gas-liquid contact are superior. Therefore, this percentage is preferably from 5 to 80%, and more preferably from 10 to 40%.

If the diameter of the pores 22 of the porous plates used as the blades 21 is from 5 to 30 mm, the porous plate can easily be produced so that production-costs can be reduced. Moreover, mechanical strength of the blades and the efficiency of the gas-liquid contact are superior. Therefore, the diameter of the pores 22 of the porous plates is preferably from 5 to 30 mm.

Figure 3:
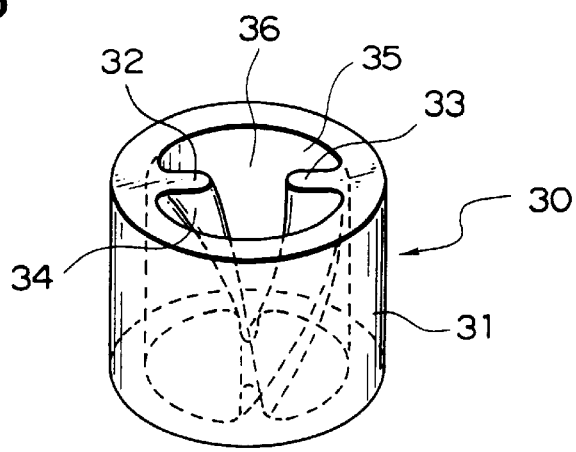
FIG. 3 is a perspective view of a 90° rotary type mixing element.
Figure 4:
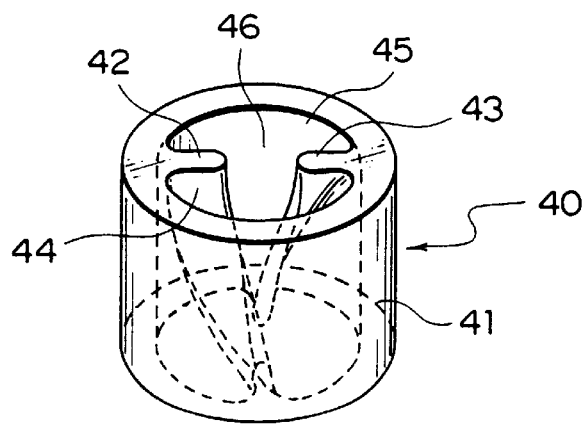
FIG. 4 is a perspective view of a 90° rotary type mixing element.
Figure 5:
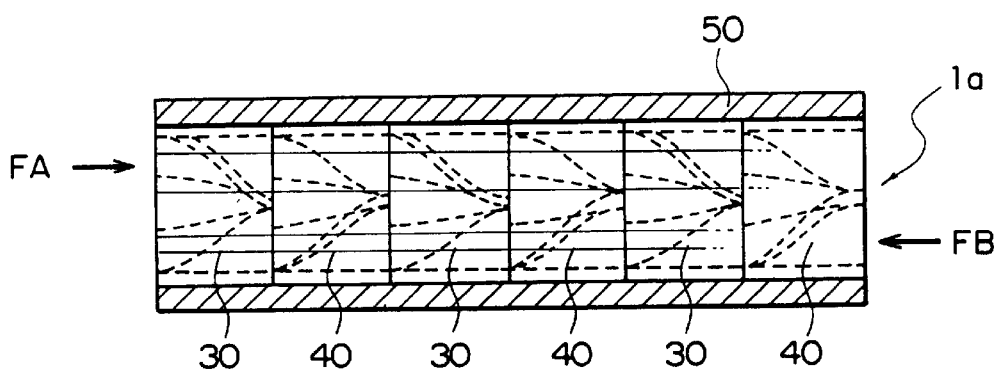
FIG. 5 is a sectional side view of a static mixer using these mixing elements.

The structure of the mixing element 2 in the present invention is not limited to the described example, and may be as follows. FIG. 3 and FIG. 4 are perspective views of 90° rotary type mixing elements, and FIG. 5 is a sectional side view of a static mixer using such mixing elements. As shown in FIGS. 3–5, mixing elements 30 and 40 have cylindrical passage tubes 31 and 41, respectively, and spiral blades 32 and 33 and spiral blades 42 and 43 set up inside the respective passage tubes 31 and 41. The blades 32 and 33 and the blades 42 and 43 are twisted by an angle of 90° in the clockwise direction (right rotation direction) and the counterclockwise direction (left rotation direction), respectively. The blades 32 and 33 and the blades 42 and 43 make fluid passages 34 and 35 and fluid passages 44 and 45, respectively. The blades 32 and 33 and the blades 42 and 43 are not present in center axis portions of the passage tubes 31 and 41, respectively. These portions are missing. In this way, as seen from the above, openings 36 and 46 which neither have blades 32, 33, 42 nor 43 are made in the center axis portions of the passage tubes 31 and 41, respectively. Accordingly, the fluid passages 34 and 35 and the fluid passage 44 and 45 can be mutually connected, over the whole length of the passage tubes 31 and 41, through the openings 36 and 46.

Such mixing elements 30 and 40 are alternately fitted into a cylindrical casing 50, and then ends of the blades 32 and 33 and the ends of the blades 42 and 43 in the mixing elements 30 and 40 are perpendicularly arranged, so that a static mixer 1a is fabricated.

As shown in FIG. 5, during the time when liquid FA and gas FB flow in directions counter to each other in the fluid passage in the static mixer 1a, a part of the liquid rotates spirally by an angle of 90°. Another part thereof is sheared at the opening, joints the liquid that has flown through the other fluid passage, is separated, and then rotates spirally by an angle of 90° in the opposite direction. As described just above, the rotation, shear, joint and separation are repeated. Similarly about the gas, the rotation, shear, joint and separation are repeated. In this manner, the liquid and the gas flowing in the directions counter to each other are mixed and subjected to gas-liquid contact. As the static mixer 1a, 180° rotary type blades may be used instead of 90° rotary type blades. Both of the blades may be made of porous plates. Furthermore, the static mixer 1a may be fabricated by arranging spacers (not illustrated) having the same inner diameter as the mixing elements 30 and 40 between these elements 30 and 40.

The rotation angle of the blades is not limited to the above-mentioned angle. Thus, for example, a 30°, 45° or 135° rotary type blades may be used in the static mixer 1a.

As shown in FIG. 1, in an apparatus 60 for removing impurities of the present embodiment, the above-mentioned static mixer 1 is arranged inside an airtight container 25 in the manner that its longitudinal direction is made vertical. In this case, the sectional shapes of the upper and lower ends of the container 25 are made, for example, /semicircular. A first reservoir 26, which is a space for reserving gas, is disposed at the upper portion of the container 25. A first supplying means (not illustrated) for supplying liquid containing impurities into the static mixer 1 is also arranged. A second reservoir 27, which is a space for reserving liquid, is disposed at the lower portion of the container 25. A second supplying means (not illustrated) for supplying gas used, for example, to remove the impurities into the static mixer 1 is also arranged. Furthermore, the gas reserved in the first reservoir 26 can be discharged or recovered. The liquid reserved in the second reservoir 27 can also be recovered.

The following will describe operation of the apparatus 60 for removing impurities in liquid, which is shown in FIG. 1. First, liquid containing impurities to be removed and gas used to remove the impurities are supplied at a given ratio into the static mixer 1 through the first and second supplying means. The liquid drops down in the static mixer 1, and the gas rises up in the static mixer 1. As a result, the liquid and the gas are stirred and mixed so that the gas and the liquid contact sufficiently with each other. In the static mixer 1, the gas-liquid contact causes vaporization of the impurities in the liquid, dissolution of the gas in the liquid, exposure of the gas to the liquid, or advance of reaction therebetween, so as to transfer the impurities into the gas. Thus, the impurities are separated from the liquid, or the liquid is purified. Thereafter, the liquid from which the impurities have been separated is collected as treated water 5 in the second reservoir 27 of the container 25, and the gas containing the impurities is collected in the first reservoir 26 of the container 25. In this way, the gas containing the impurities is discharged or recovered from the top end of the container 25, and the treated liquid from which the impurities have been removed is recovered from the lower end of the container 25. In the present invention, volatile matters or the like, as well as the impurities, can be removed from liquid containing the volatile matters.

In the present embodiment, continuous stripping treating of a chlorinated organic compound contained in raw water 3 can be performed. For example, the raw water 3 containing the chlorinated organic compound is supplied to the static mixer 1 from its upper side. Water vapor 4 is supplied to the static mixer 1 from its lower side. The raw water 3 is caused to drop inside the static mixer 1, and the water vapor 4 is caused to rise up in such a manner that the speed thereof is set up to 2–5 m/second. In this way, the chlorinated organic compound in the raw water 3 is continuously stripped with the water vapor 4 so that the chlorinated organic compound is separated from the raw water 3. Thus, the raw water 3 is purified and recovered as the treated water 5. By this process, the chlorinated organic compound 6a can be discharged or recovered in a gas form from the first reservoir 26 of the static mixer 1 and the treated water 5 can be recovered from the second reservoir 27 of the static mixer 1.

The present invention can be applied to treatment of liquid waste discharged in the process of producing propylene oxide.

Figure 6:
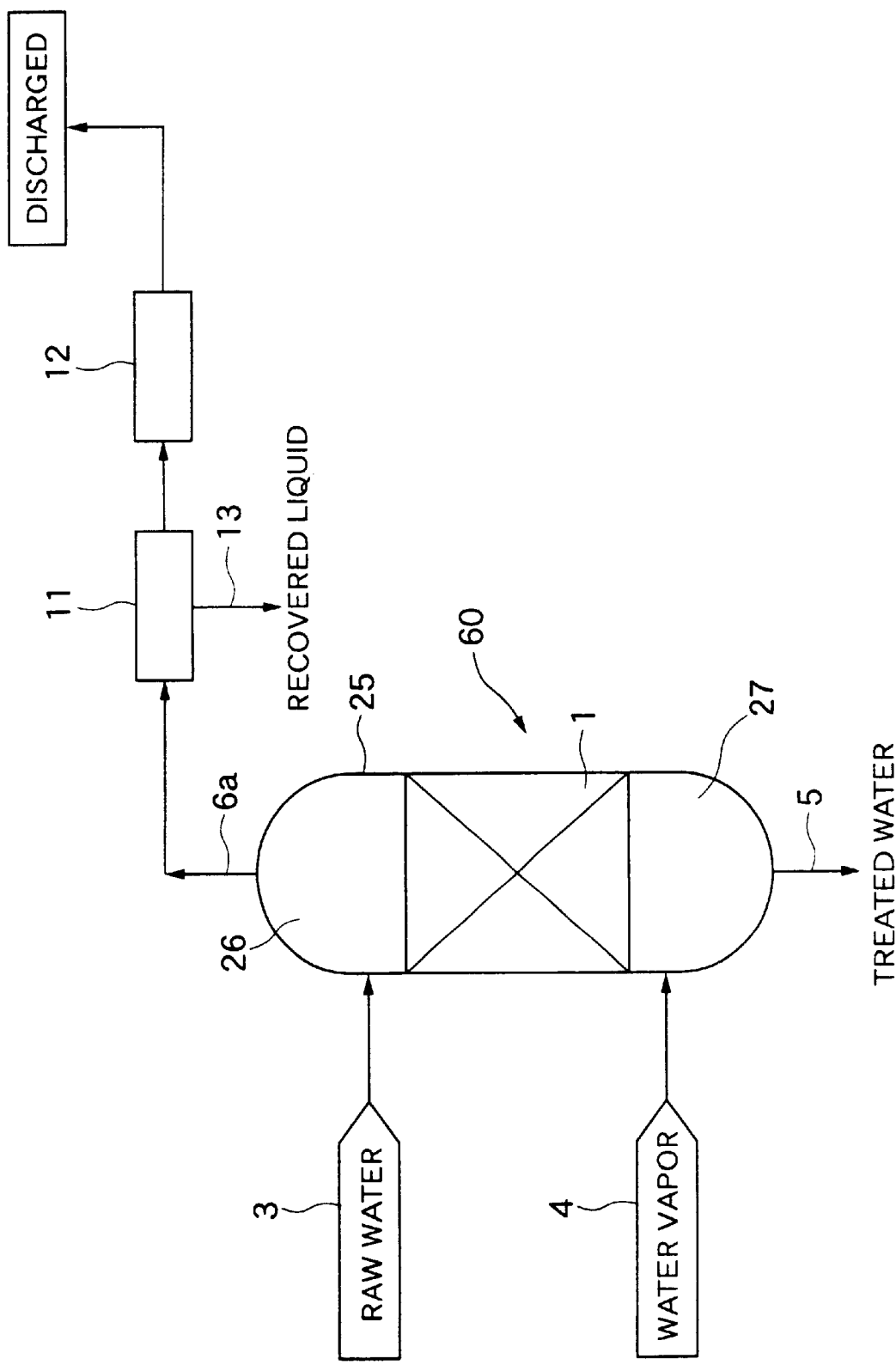
FIG. 6 is a schematic view showing an apparatus for removing impurities in liquid according to a second embodiment of the present invention wherein the present invention is applied to clarifying/recovering treatment of raw water containing a chlorinated organic compound.

Next, a second embodiment of the present invention will be described. FIG. 6 is a schematic view showing an apparatus for removing impurities in liquid according to the second embodiment in which the present invention is applied to clarifying/recovering treatment of raw water containing a chlorinated organic compound. In the impurity-removing apparatus 60, a cooling system 11 is connected to a first reservoir 26. This cooling system 11 causes gas containing the chlorinated organic compound 6a to be in a liquid form, and the resultant liquid is recovered as recovered liquid 13. A pressure-reducing device 12 is set up to the cooling system 11, and water vapor 4 or the like is discharged from the pressure-reducing device 12.

The raw water 3 discharged in the above-mentioned step of producing propylene oxide contains Ca-based compounds such as $Ca(OH)_2$ and $CaCl_2$, as understood from the following chemical reaction formula:

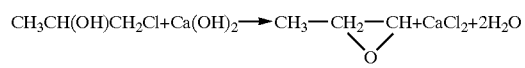

The size of the static mixer 1 of the impurity-removing apparatus 60 shown in FIG. 6 is as follows: for example, its diameter is 1.5 m, and its length is 10 m. The concentration of the chlorinated organic compound in the raw water 3 is, for example, 300 mass ppm, and the concentration of Ca-based compounds is 4–7 mass %. If in this case the treating amount of the raw water 3 is 600 m$^3$/hour and the amount of water vapor is 4 tons/hour, the concentration of the chlorinated organic compound in the treated water 5 can be made to 30 mass ppm or less. As the recovered liquid 13, liquid containing the chlorinated organic compound 6a can be recovered. In the impurity-removing apparatus 60, liquid-flowing velocity is about 300–340 m$^3$/(m$^2$·hour) and superficial velocity of the gas is about 3 m/second.

Hitherto, a problem that maintenance becomes necessary because scaling of Ca-based compounds in apparatus has arisen. In the present embodiment, however, scaling of Ca-based compounds is not caused so that maintenance and costs for the maintenance become unnecessary.

Since a tray tower or the like has been hitherto used, the difference between pressure at the top of the tower and the pressure at the bottom thereof becomes large so that consumption of water vapor also becomes great in quantity. On the other hand, pressure loss is small in the present apparatus 60, so that the consumption of the water vapor 4 also becomes small in quantity. As a result, energy is saved. The liquid-flowing velocity in the present apparatus 60 is set up to 300–340 m$^3$/(m$^2$·hour), and the raw water 3 can be treated at this velocity. Therefore, the present embodiment is 5–10 times better than the prior art. For this reason, the diameter of the tower is made small so that space can be saved.

Figure 7:
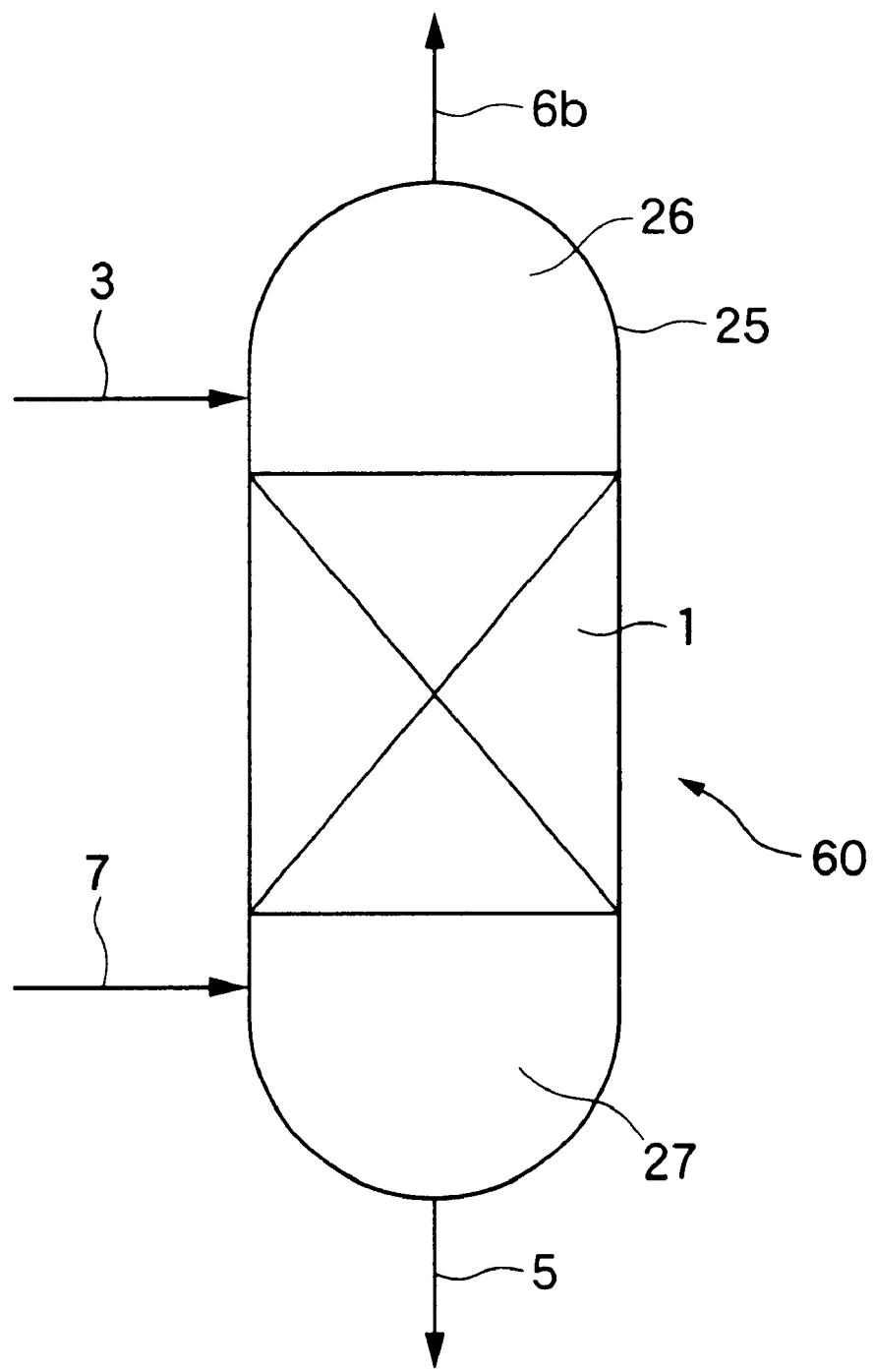
FIG. 7 is a schematic view showing an apparatus for removing impurities in liquid according to a third embodiment of the present invention.

The following will describe a third embodiment of the present invention. FIG. 7 is a schematic view showing an apparatus for removing impurities in liquid according to the third embodiment. To the same structural elements as in the first embodiment shown in FIG. 1, the same reference numbers are attached. Detailed explanations thereof are omitted.

The impurity-removing apparatus 60 of the present embodiment is suitable for continuous treatment of exposure to gas, which is different from the first embodiment. The two embodiments are the same in other structural elements.

In the present embodiment, for example, raw water 3 containing NH$_3$ is supplied into a static mixer 1 from its upper end, and compressed air 7 is supplied into the static mixer 1 from its lower end, so that the raw water 3 is caused to drop down inside the static mixer 1 and the compressed air 7 is caused to rise up at a flow rate of 2–8 m/second. In this way, NH$_3$ in the raw water 3 is exposed to the compressed air 7 and NH$_3$ is separated from the raw water 3 so that the raw water 3 is purified and recovered as treated water 5. In this way, NH$_3$ gas 6b can be discharged and recovered from a first reservoir 26 of the static mixer 1, and the treated water 5 can be recovered from a second reservoir 27 of the static mixer 1.

In the present embodiment, O$_2$ can be removed even from raw water containing O$_2$. Examples of gas used for the exposure include an inert gas such as N$_2$, He and Ar.

The present invention can be applied to clarifying of raw water and recovery of NH$_3$ by exposing nitrogen compounds such as NH$_3$ in the raw water 3 to water vapor.

Figure 8:
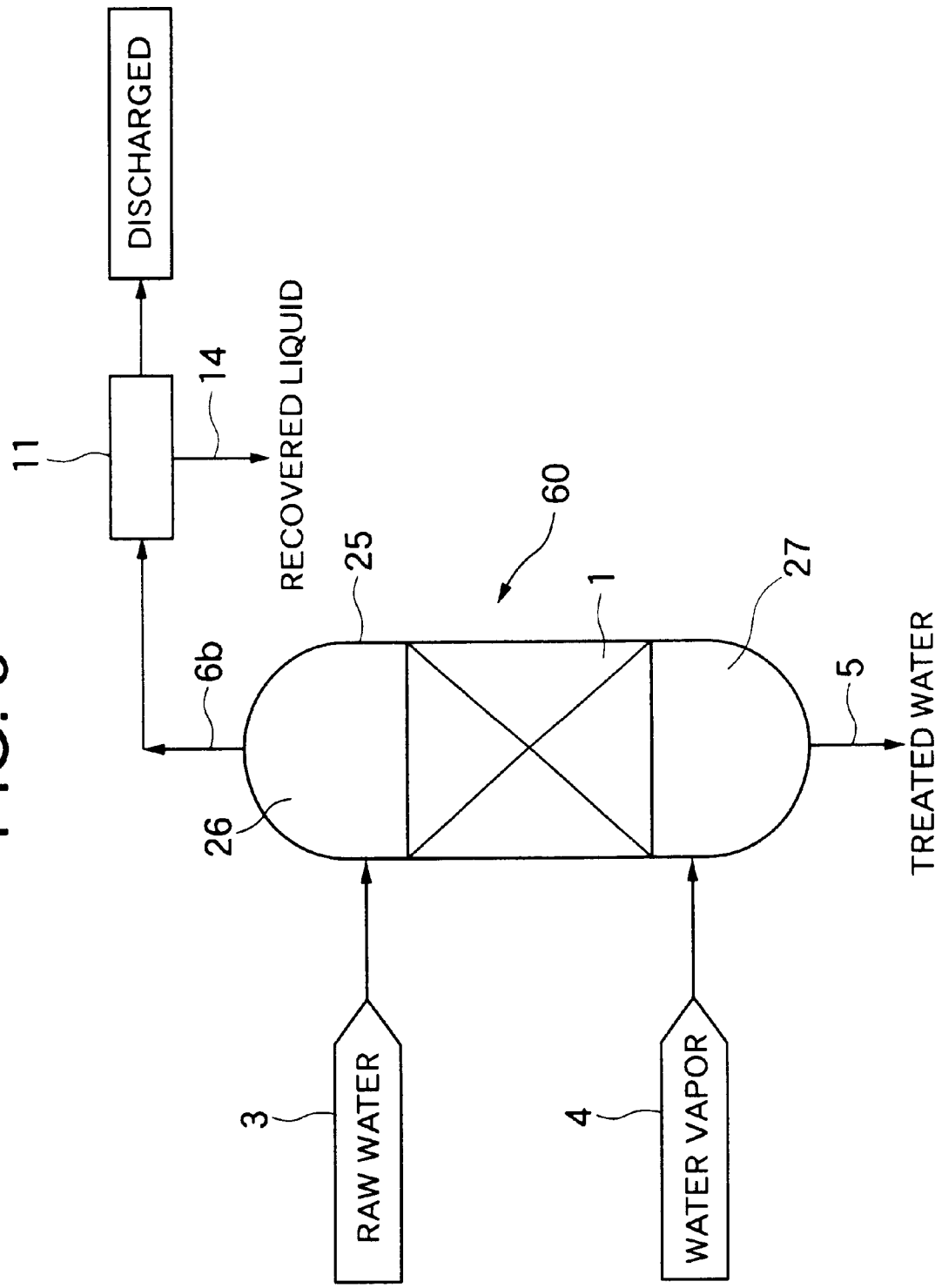
FIG. 8 is a schematic view showing an apparatus for removing impurities in liquid according to a fourth embodiment of the present invention wherein the present invention is applied to clarifying/recovering treatment of raw water containing a nitrogen compound.

Next, a fourth embodiment of the present invention will be described. FIG. 8 is a schematic view showing an apparatus for removing impurities in liquid according to the present embodiment, wherein the present invention is applied to clarifying and recovering treatment of raw water containing nitrogen compounds. This apparatus does not have the pressure-reducing device 12 in the apparatus 60 used in the clarifying and recovering treatment of raw water in the second embodiment shown in FIG. 6. This matter is different from the second embodiment, and these two embodiments are the same in other structural elements. In the present embodiment, NH$_3$ gas 6b is liquefied through a cooling system 11, so that aqueous NH$_4$OH solution is recovered as recovered liquid 14 and further water vapor 4 is discharged from the cooling system 11.

For example, raw water 3 has a pH of 10–12, and a NH$_3$ concentration of 1–5 mass %. If in this case the treating amount of the raw water 3 is 1.2 m$^3$/hour and the amount of water vapor is 300 kg/hour, the NH$_3$ concentration in the treated water 5 can be made to 500 mass ppm or less. As the recovered liquid 14, aqueous 20% NH$_4$OH solution can be recovered. In this case, liquid-flowing velocity in the impurity-removing apparatus 60 is 40 m$^3$/(m$^2$·hour) and superficial velocity of the gas is about 3 m/second.

In a tray tower, a packed tower or the like in the prior art, scaling based on Ca-based compounds is generated in the raw water 3. As a result, it becomes necessary to stop, clean and maintain the facilities. In the case that a Ca-based compound is used for adjustment of pH of the raw water 3, the number of maintenance operations increases so that costs for maintenance rise up. However, it is unnecessary to stop, clean and maintain the facilities since no scaling is generated in the apparatus 60 of the present embodiment.

The superficial velocity of gas in the present embodiment is 2–4 times better than that in the prior art. Thus, the diameter of the tower in the present embodiment can be made small so that space can be saved.

Figure 9:
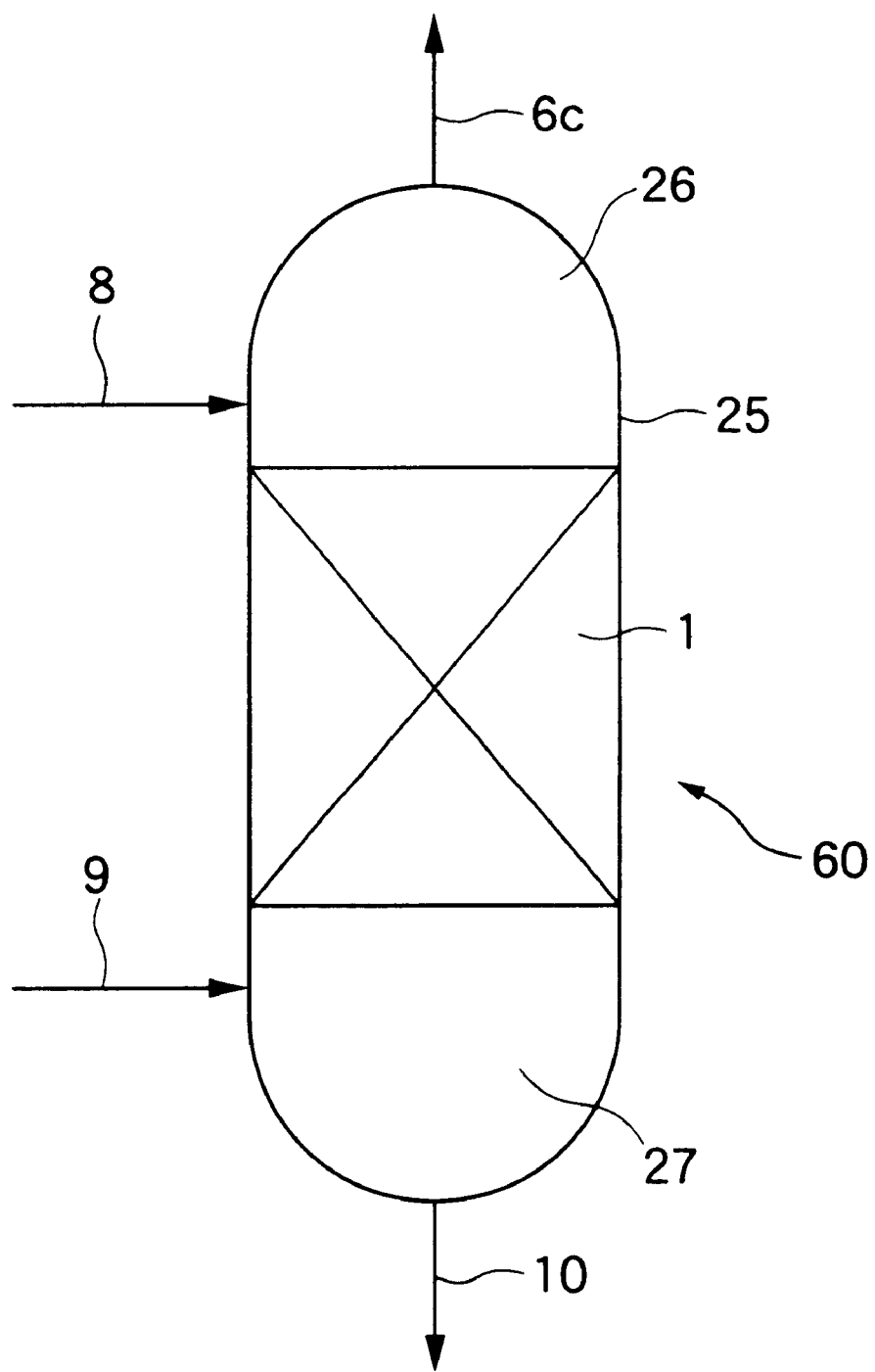
FIG. 9 is a schematic view showing an apparatus for removing impurities in liquid according to a fifth embodiment of the present invention.

The following will describe a third embodiment of the present invention. FIG. 9 is a schematic view showing an apparatus for removing impurities in liquid according to the third embodiment. To the same structural elements as in the first embodiment shown in FIGS. 1–6, the same reference numbers are attached. Detailed explanations thereof are omitted.

The impurity-removing apparatus 60 of the present embodiment is suitable for hydro-refining and hydrodesulfurization, which is,different from the first embodiment. These two embodiments are the same in other structural elements.

In the present embodiment, for example, fuel oil 8 containing sulfur is supplied into a static mixer 1 from its upper end, and hydrogen gas (H$_2$ gas) 9 is supplied into the static mixer 1 from its lower end, so that the fuel oil 8 is caused to drop down inside the static mixer 1 and the hydrogen gas 9 is caused to rise up at a flow rate of 3–6 m/second. In this way, sulfur in the fuel oil 8 is brought in contact with the hydrogen gas 9. As a result, H$_2$S compounds are generated so that desulfurization is carried out and the fuel oil 8 is purified. In this way, H$_2$S gas 6c can be discharged and recovered from a first reservoir 26 of the static mixer 1, and the treated fuel 10 can be recovered from a second reservoir 27 of the static mixer 1.

In all of the embodiments, impurities can be removed under a decompressed, compressed, heated or cooled condition, dependently on the sorts of the impurities to be removed. The flow rate of gas in the static mixer 1 is preferably from 1 to 10 m/second, and more preferably from 2 to 6 m/second. By this condition, the outer diameter of the container 25 can be made small. Thus, the size of the apparatus can be made smaller so that space can be saved.

What is claimed is:

1. An apparatus for removing impurities in liquid, comprising:

a liquid supply mechanism configured to supply liquid containing impurities;

a gas supply mechanism configured to supply gas for removing the impurities from the liquid; and a static mixer arranged so that a longitudinal direction of the static mixer is vertical, the static mixer connected to the liquid supply mechanism at an upper end portion of the static mixer to receive the liquid and to the gas supply mechanism at a lower end portion of the static mixer to receive the gas, the static mixer including a plurality of mixing elements each comprising a passage tube through which fluid is capable of passing and a plurality of porous spiral blades arranged inside the passage tube, the plurality of mixing elements being provided continuously or through one or more spacers such that the porous spiral blades are twisted in the right and left directions alternately in the longitudinal direction thereof, the porous spiral blades each having a plurality of pores whose diameters are between 5 mm and 30 mm and total porous area is between 5% and 80%;

wherein the liquid drops down inside the static mixer and the gas rises up inside the static mixer so that the liquid and gas are subjected to gas-liquid contact inside the static mixer and the impurities are gasified or reacted with the gas, whereby the impurities are separated from the liquid and discharged together with the gas.

2. The apparatus for removing the impurities in the liquid according to claim 1, wherein the porous spiral blades do not extend to a center portion of the passage tube.

3. The apparatus for removing the impurities in the liquid according to claim 1, wherein the gas supply mechanism is configured to supply the gas such that a flow rate (superficial velocity) of the gas in the static mixer is between 1.0 and 10 m/second.

4. An apparatus for removing impurities in liquid, comprising:
   a liquid supply mechanism configured to supply liquid containing impurities;
   a gas supply mechanism configured to supply gas for removing the impurities from the liquid; and
   a static mixer connected to the liquid supply mechanism at an upper end portion of the static mixer to receive the liquid and to the gas supply mechanism at a lower end portion of the static mixer to receive the gas, the static mixer including a plurality of mixing elements, the mixing elements each including a passage tube configured to permit the liquid to pass through and a plurality of porous spiral blades twisted in one direction and disposed inside the passage tube, the mixing elements being connected such that the porous spiral blades are twisted in opposite directions alternately in the static mixer.

5. The apparatus for removing the impurities in the liquid according to claim 4, wherein the mixing elements are connected continuously inside the passage tube.

6. The apparatus for removing the impurities in the liquid according to claim 4, wherein the mixing elements are connected through at least one spacer inside the passage tube.

7. The apparatus for removing the impurities in the liquid according to claim 4, wherein the porous spiral blades have a plurality of pores whose diameters are between 5 mm and 30 mm and total porous area is between 5% and 80%.

* * * * *